United States Patent [19]

Smith

[11] 4,356,348

[45] Oct. 26, 1982

[54] TECHNIQUES FOR DETECTING A CONDITION OF RESPONSE ON A TELEPHONE LINE

[75] Inventor: Fred J. Smith, Plantation, Fla.

[73] Assignee: Digital Products Corporation, Fort Lauderdale, Fla.

[21] Appl. No.: 101,149

[22] Filed: Dec. 7, 1979

[51] Int. Cl.³ .............................................. H04M 3/22
[52] U.S. Cl. ................................ 179/1 MN; 179/6.02; 179/81 R; 179/90 B
[58] Field of Search .................... 179/1 MN, 5 R, 5 P, 179/6 R, 6 C, 6 D, 84 VF, 100.1 VC, 84 R, 18 FA, 6.02, 90 B, 81 R

[56] References Cited

U.S. PATENT DOCUMENTS

| | | | |
|---|---|---|---|
| 3,927,259 | 12/1975 | Brown | 179/1 MN |
| 4,160,125 | 7/1979 | Bower et al. | 179/6 D |

FOREIGN PATENT DOCUMENTS 2005964  4/1979  United Kingdom ............... 179/5 R

*Primary Examiner*—Joseph A. Popek
*Attorney, Agent, or Firm*—Lerner, David, Littenberg & Samuel

[57] ABSTRACT

Methods and apparatus for detecting a condition of response on a telephone line are disclosed in accordance with the teachings of the present invention wherein time intervals between the zero crosspoints of an input signal are ascertained and the most prevalent interval determined. The most prevalent interval determined is compared with succeeding time intervals of the input signal and the results of such comparison are employed in classifying the input signal as periodic or not. The nature of the periodic or non-periodic signals are further analyzed to ascertain the condition on the line and an absence of signal for a selected period following a detection of periodic or non-periodic input signals may then be relied upon to indicate that an announce operation may be initiated.

42 Claims, 4 Drawing Figures

TECHNIQUES FOR DETECTING A CONDITION OF RESPONSE ON A TELEPHONE LINE

BACKGROUND OF THE INVENTION

The present invention relates to techniques for detecting a condition of response on a telephone line and, more particularly, to methods and apparatus for monitoring a telephone line, detecting a condition of response thereon and evaluating the nature of such response.

In automatic telephone dialing equipment it is necessary, once a telephone number has been dialed, to ascertain a condition of response on the telephone line. More particularly, it is necessary to determine when the automatic dialing function initiated by such equipment has caused a ringing condition on the telephone line, a busy signal has resulted, the telephone has been answered and, if an answer has occurred, when silence is present to indicate that the party called is awaiting a response. Such information, as will be readily appreciated by those or ordinary skill in the art, is necessary in automatic telephone dialing equipment since ringing may only be permitted to continue for a predetermined period before a decision is made to hang up and proceed to the next telephone number to be dialed in sequence. The same events must take place any time a condition of response on the line corresponding to a busy signal occurs. Conversely, when the telephone is answered the nature of such answer must be ascertained in order to discern whether or not the automatic dialing equipment should proceed with a presentment of a prerecorded message and, if such prerecorded message is to be issued, the timing therefor must coincide with a termination of the answering partie's salutation. Thus, in each case, once the telephone number is dialed by automatic telephone dialing equipment, the telephone line must be monitored and the various conditions of response which may occur thereon detected and evaluated.

Prior art techniques for accomplishing these objectives have typically taken the form of various approaches to detecting tone and speech signals as may be present on a telephone line. For instance, in the telephone polling apparatus disclosed in U.S. Pat. No. 4,160,125, as issued to David S. Bower et al. on July 3, 1979 and assigned to the same assignee as the instant application, there is disclosed a technique for detecting the presence of various tone and speech signals on the line through a reliance upon the various time delay intervals exhibited by different types of signals to achieve the necessary discrimination. However, the techniques employed therein are subject to error due to widely ranging variations in tone signals which may occur on the telephone line. This is disadvantageous in that whenever such errors occur the automatic telephone polling apparatus is inefficiently employed and may, in fact, result in an alienation of individuals contacted. Another technique, less subject to error, is disclosed in U.S. Pat. No. 3,521,235 as issued to Peter W. Becker on July 21, 1970. The techniques set forth in this disclosure employ a pattern recognition scheme in which several signals representing known patterns are entered, tabulated and are thereafter utilized as a reference for subsequent signals to be recognized utilizing a digital approach to pattern recognition. However, while this technique is less subject to error than that previously discussed, the same requires a relatively long "learning period" and, additionally, a substantial amount of dedicated equipment is employed and, hence, this approach is quite costly and often unsuited to applications such as automatic telephone polling apparatus wherein cost of the system is a principal consideration.

Therefore, it is an object of this invention to provide improved methods and apparatus for detecting a condition of response on a telephone line.

A further object of this invention is to provide improved methods and apparatus for detecting the presence of a periodic signal on a telephone line and for evaluating such signal.

An additional object of this invention is to provide methods and apparatus for detecting the presence of speech and tone signals on a telephone line and for discriminating therebetween.

Another object of the present invention is to provide periodic and non-periodic signal detection methods and apparatus which are highly accurate.

A further object of the present invention is to provide signal detection methods and apparatus not requiring substantial "learning periods".

Various other objects and advantages of the present invention will become clear from the following detailed description of an exemplary embodiment thereof, and the novel features will be particularly pointed out in conjunction with the claims appended hereto.

SUMMARY OF THE INVENTION

In accordance with the teachings of the present invention, methods and apparatus for detecting a condition of response on a telephone line are provided wherein time intervals between the zero crosspoints of an input signal are ascertained and the most prevalent interval is determined, the most prevalent interval determined is compared with succeeding time intervals of said input signal and the results of such comparison are employed in classifying said input signal as periodic or not; an absence of signal for a selected period following a detection of non-periodic or periodic input signals may be relied upon to indicate that an announce operation may be initiated.

BRIEF DESCRIPTION OF THE DRAWINGS

The invention will be more clearly understood by reference to the following detailed description of an exemplary embodiment thereof in conjunction with the accompanying drawings in which.

DETAILED DESCRIPTION

Figure 1:
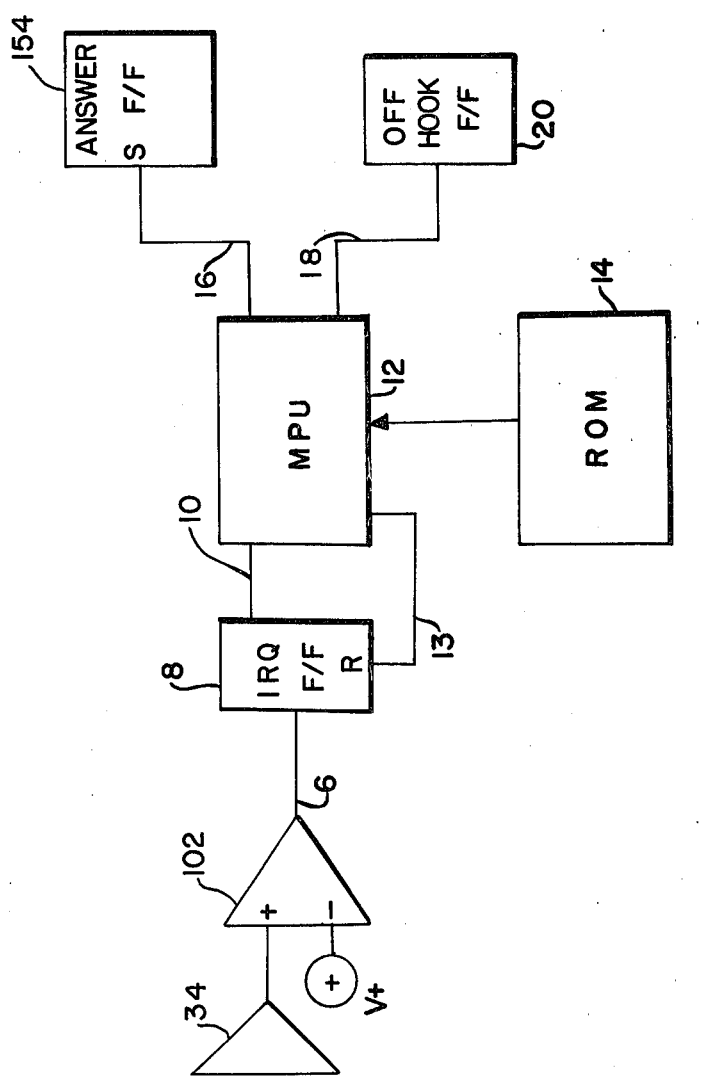
- FIG. 1 is a block diagram serving to schematically illustrate the generalized embodiment of the instant invention.

Although the instant invention is of general application, a typical use therefor would be within an automatic dialing and recording system which is microprocessor based or, alternatively, of the type disclosed in U.S. Pat. No. 4,160,125 as issued to Bower et al. on July 3, 1979 and assigned to the same assignee as the instant application. Therefore, to facilitate an appreciation of the instant disclosure within a typical environment of application, the disclosure of U.S. Pat. No. 4,160,125 is hereby incorporated by reference herein and the disclosure of the instant invention shall proceed as if the apparatus depicted in FIG. 1 hereof were to replace selected portions of the apparatus illustrated in the patent of Bower et al., as aforesaid. Such replacement, as will be readily appreciated by those of ordinary skill in the art upon an inspection of U.S. Pat. No. 4,160,125, will occur by a replacement of the apparatus disclosed in FIG. 2 and a portion of FIG. 3 in the patent to Bower et al. with such apparatus as illustrated in FIG. 1 of the instant application and it will be additionally appreciated that, to facilitate an appreciation of the manner in which connection occurs, reference numerals employed in the patent to Bower et al. for the locations at which connections with the replacement apparatus illustrated in FIG. 1 occur have been adopted in FIG. 1 herein. However, as the instant invention is devoted to detecting a condition of response on a telephone line and provides appropriate outputs indicative of the condition detected, no detailed description of operation as part of a larger system will be set forth herein.

Referring now to the drawings and, more particularly, to FIG. 1 thereof, there is shown a block diagram serving to schematically illustrate the generalized embodiment of the instant invention. The generalized embodiment of the instant invention schematically shown in FIG. 1 comprises amplifier means 34, comparator means 102, interrupt request flip-flop means 8, microprocessor means 12, ROM means 14, off hook flip-flop means 20 and answer flip-flop means 154. The amplifier means 34 may take any of the well known forms of this conventional type of device. More particularly, the amplifier means 34, as explained in U.S. Pat. No. 4,160,125, as aforesaid, and shown in FIG. 2 of this patent acts to receive information from the telephone line after the same has been passed through an analog gate (not shown) so that such information may be acted upon by the VOX circuitry disclosed therein. Thus, the amplifier means 34, as shown herein, acts to couple information on the telephone line to the remaining apparatus for detecting a condition of response on the telephone line, as shown in FIG. 1, so that the same may be further acted upon and it will be appreciated by those of ordinary skill in the art that the amplifier means 34 acts in the conventional manner to supply appropriate gain to inputs received thereby so that the same may be responded to.

The output of the amplifier means 34, as shown in FIG. 1, is connected to a non-inverting input of the comparator means 102. The comparator means 102 may take the conventional form of a differential amplifier or the like having a non-inverting and inverting input. The inverting input to the comparator means 102 is connected to a bias supply V+ so that, in effect, the comparator means 102, as also explained in U.S. Pat. No. 4,160,125 and shown in FIG. 2 thereof, acts as a threshold amplifier in that only inputs from the amplifier means 34 are passed thereby if they exceed the bias level V+ applied to the inverting input thereof. Accordingly, under these circumstances, it will be appreciated by those of ordinary skill in the art that the comparator means 102 acts to supply a preset squelch for inputs being conveyed from the telephone line through the amplifier means 34 to the instant invention so that only such inputs as exceed the present bias or squelch value associated with the reference supply V+ are further conveyed. The output of the comparator means 102 is supplied through a conductor 6 to the input of the interrupt request (IRQ) flip-flop means 8.

The interrupt request flip-flop means 8 may take any of the conventional forms of this well known class of device and acts to change from a first to a second state each time an input is supplied thereto from the comparator means 102 on the input conductor 6. An output of the interrupt request flip-flop means 8 is connected through conductor 10 to an input to the microprocessor means 12 which, as will be readily appreciated by those of ordinary skill in the art, corresponds to the interrupt request input thereof. The reset input of the interrupt request flip-flop 8 is connected as illustrated in FIG. 1 to the microprocessor means 12 and, as will be appreciated by those of ordinary skill in the art, will cause the flip-flop means to be reset from a second to a first state when the same is activated by the microprocessor means 12.

Furthermore, as will be apparent to those of ordinary skill in the art, it will be seen that the output of the comparator means 102 goes high in response to signals from the telephone line, corresponding to zero crossings of the input signal which exceed a predetermined level as established by the present bias and cause a toggling of the interrupt request flip-flop 8. Upon a toggling of the interrupt request flip-flop 8, an interrupt request, as manifested by a change in state thereof, is generated on the conductor 10 and applied to the microprocessor means 12. When this interrupt request is responded to by the microprocessor, the interrupt request flip-flop means 8 is automatically reset by a reset signal generated by the microprocessor on conductor 13 so that the interrupt request flip-flop 8 is in condition to respond to the next zero crossing of an input signal as established by the present bias V+ of the comparator means 102. Thus, as each zero crossing of input signals from the telephone line are received, the same are amplified by the amplifier means 34, threshold compared by the comparator means 102 and employed to cause the interrupt request flip-flop means 8 to generate an interrupt request. When the interrupt request is taken by the microprocessor means 12, the interrupt request flip-flop 8 is automatically reset thereby so that a new interrupt request may be generated thereby upon receipt of a new zero crossing input signal.

The microprocessor means 12 may comprise any of the conventional forms of this well known class of device, it being noted that neither high speed nor substantial processing power is required. For example, an MC6802 Microprocessor with clock and RAM such as is available from Motorola Semiconductors, 3501 Ed Bluestein Boulevard, Austin, Texas, 78721 may be employed and, in fact, was utilized with an embodiment of this invention which was built and tested. Thus, if it is considered for purposes of disclosure that such MC6802 Microprocessor was employed, the microprocessor means 12 would comprise an 8 bit microprocessor containing all the registers and accumulators necessary plus an internal clock oscillator, drivers on the same chip as well as 128 bytes of addressable RAM. This microprocessor is also expandable to 65K words of RAM and has standard TTL-compatible inputs and outputs, 8 bit word size, 16 bit memory addressing and interrupt capability.

The interrupt of IRQ input to the microprocessor means 12 is connected to conductor 10 so that the interrupt request flip-flop means 8 may generate interrupt requests, as aforesaid. As will be appreciated by those of ordinary skill in the art, the interrupt request input is a level sensitive input which is interpreted as a request that an interrupt sequence be generated within the microprocessor means 12. The microprocessor means 12 will wait until it completes a current instruction that is being executed before it recognizes that request. At that time, if the interrupt mask bit is not set, an interrupt sequence will be initiated. Prior to servicing the request, the index register, program counter, accumulators and condition code registers are stored away in the stack. The microprocessor will then respond to the interrupt request by setting the interrupt mask bit high so that no further interrupts may occur. At the end of a cycle, a 16 bit address will be loaded that points to a vectoring address which is located in memory and the address located therein causes the microprocessor to branch to an interrupt routine in memory.

The microprocessor means 12 is provided with a ROM 14 which contains the program for controlling the operation thereof. The ROM 14 may take any conventional form of this well known class of device and for purposes of the instant disclosure a 2K by 8 ROM such as a TMS2716, as available from Texas Instruments of Dallas, Tex., may be employed. Thus, as will be appreciated by those of ordinary skill in the art, the interrupt requests generated by the interrupt request flip-flop 8 are processed by the microprocessor means 12 in the manner controlled by the program within the ROM 14. While the processing conducted by the microprocessor means 12 shall be described in great detail in conjunction with the functional flow charts set forth in FIGS. 2 through 4 hereof, a detailed, annotated program listing is attached hereto as an appendix so that those of ordinary skill in the art will be provided with a total disclosure as to the content of the ROM 14 and, hence, the processing instructions provided to the microprocessor means 12.

Figure 3:
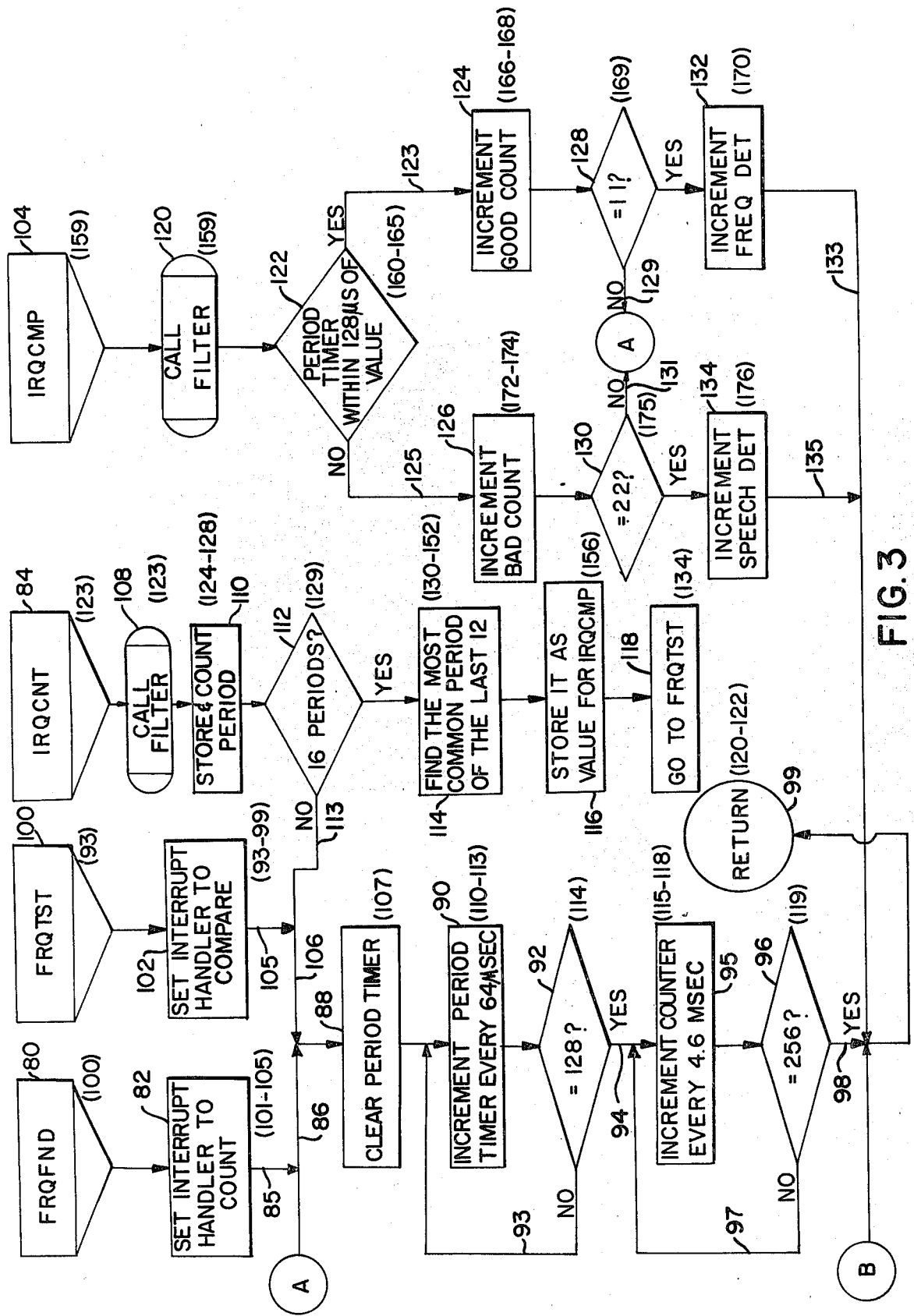
FIG. 3 is a functional flow diagram illustrating various sub-routines employed in branch operations of the main routine illustrated in FIG. 2.

The microprocessor means 12 is provided with first and second outputs on conductors 16 and 18 as shown. The output of the microprocessor means 12 on conductor 16 is connected to the set input of the answer flip-flop means 154, while the output of the microprocessor means 12 connected to conductor 18 is applied to the off hook flip-flop means 20. The answer flip-flop means 154 may take a conventional form of flip-flop which is set each time an input is supplied thereto on conductor 16. The answer flip-flop means 154 is also illustrated in FIG. 3 of U.S. Pat. No. 4,160,125 and its operation is fully described therein. Here, it is sufficient to appreciate that each time this flip-flop is set by an output of the microprocessor means 12, the processing which has occurred within the microprocessor has ascertained that an automatically dialed call has been answered and a response is being awaited. Therefore, the setting of the answer flip-flop means 154 will initiate an annunciator activity such as the playback of a prerecorded message on to the telephone line. Similarly, the off hook flip-flop means 20 may take any of the conventional forms of this well known class of device and here acts to set the on hook or off hook condition of the automatic dialing system with respect to a particular line. More particularly, when the microprocessor means 12 is involved in a dialing operation, an output is provided to initially set the off hook condition of flip-flop 20 so a dialtone may be ascertained on the telephone line and a dialing operation initiated. Conversely, and what is more relevant for the purposes of the instant disclosure is that whenever the microprocessor unit 12 has ascertained that no taped announcement may be placed to a location dialed, the microprocessor means 12 places an output on conductor 18 which causes the off hook flip-flop means 20 to be reset to cause the automatic dialing unit to hang up.

In operation of the embodiment of this invention illustrated in FIG. 1, it will be seen that inputs from the telephone line are amplified by the amplifier means 34 and applied to the non-inverting input of the comparator means 102. All such inputs which exceed the preset bias or squelch level associated with the comparator means 102 are provided as outputs on the conductor 6 so that, in effect, the comparator 102 only permits signals above a certain level to appear at its output whereupon the zero crossings of an input signal are applied to the input of the interrupt request flip-flop means 8 to cause an interrupt request to be generated on conductor 10 thereby. Accordingly, the interrupt request flip-flop means 8 monitors the output of the comparator means 102 and generates an interrupt request output on conductor 10 each time a zero crosspoint is detected on the telephone line being monitored. Each interrupt request generated by the interrupt request flip-flop means 8 is serviced by the microprocessor means 12 and upon servicing of each request, the microprocessor means 12 resets the interrupt request flip-flop means 8 on conductor 13. Accordingly, each zero crosspoint of an input signal on the telephone line being monitored acts to generate an interrupt request to the microprocessor means 12 whereupon the interrupt request flip-flop means 8 is reset by the microprocessor means 12.

Figure 4:
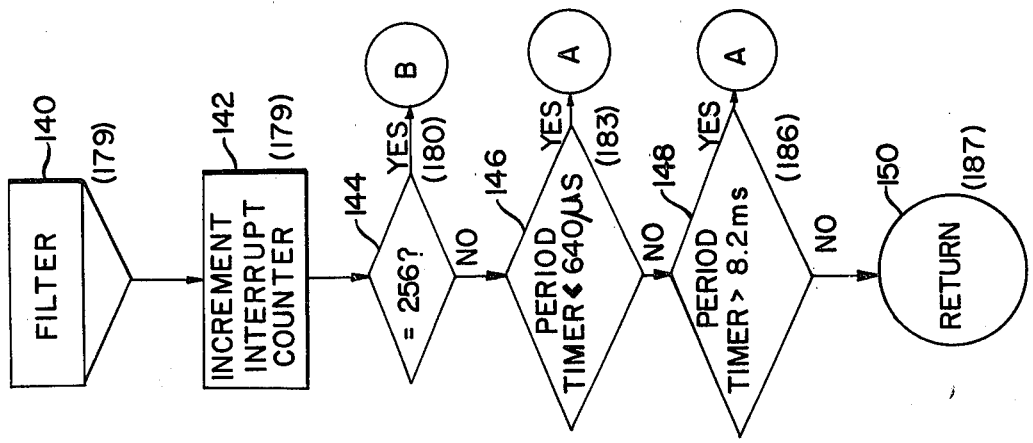
FIG. 4 is a functional flow diagram illustrating an exemplary digital filter sub-routine employed for the purpose of filtering input signals to be examined under program control.

The microprocessor means 12 is responsive to each interrupt request generated thereby to treat such requests as data corresponding to the timing of zero crosspoints of the input signal on the telephone line to be monitored. While the precise manner in which the microprocessor means 12 processes this information and makes determinations in accordance with the program routine established in the ROM 14 will be described in great detail in conjunction with FIGS. 2-4; it is here sufficient to appreciate that the microprocessor means 12 makes determinations as to whether or not the information being received corresponds to a periodic signal, a non-periodic signal, or a non-existant signal which corresponds to silence. Thereafter, this information is employed to ascertain whether or not (1) a busy signal is present, (2) a recorded message is present, (3) a ring signal is present or (4) an answered telephone is on the line. If a busy signal or a recorded message is ascertained, the microprocessor causes a reset signal to be issued to the off hook flip-flop 20 to cause the system to hang up immediately. However, if a ring signal is ascertained, the system will wait a maximum of 32 seconds for an answered telephone condition to be ascertained. Should such condition not result within 32 seconds, a hang up routine again will be initiated through a resetting of the off hook flip-flop means 20. Whenever an answered telephone condition is detected, the answer flip-flop means 154 is set and a prerecorded message is played back onto the telephone line and, thereafter, a hang up routine is again initiated. The manner in which the interrupt requests generated on line 10 are processed by the microprocessor will be described in great detail in conjunction with FIGS. 2-4 wherein FIG. 2 is a functional flow diagram illustrating the operation of the embodiment of the invention illustrated in FIG. 1 under program control according to a main routine, FIG. 3 is a functional flow diagram illustrating various sub-routines employed in the branch operations of the main routine and FIG. 4 is a functional flow diagram illustrating a digital filter sub-routine employed to restrict input signals being examined under program control.

Figure 2:
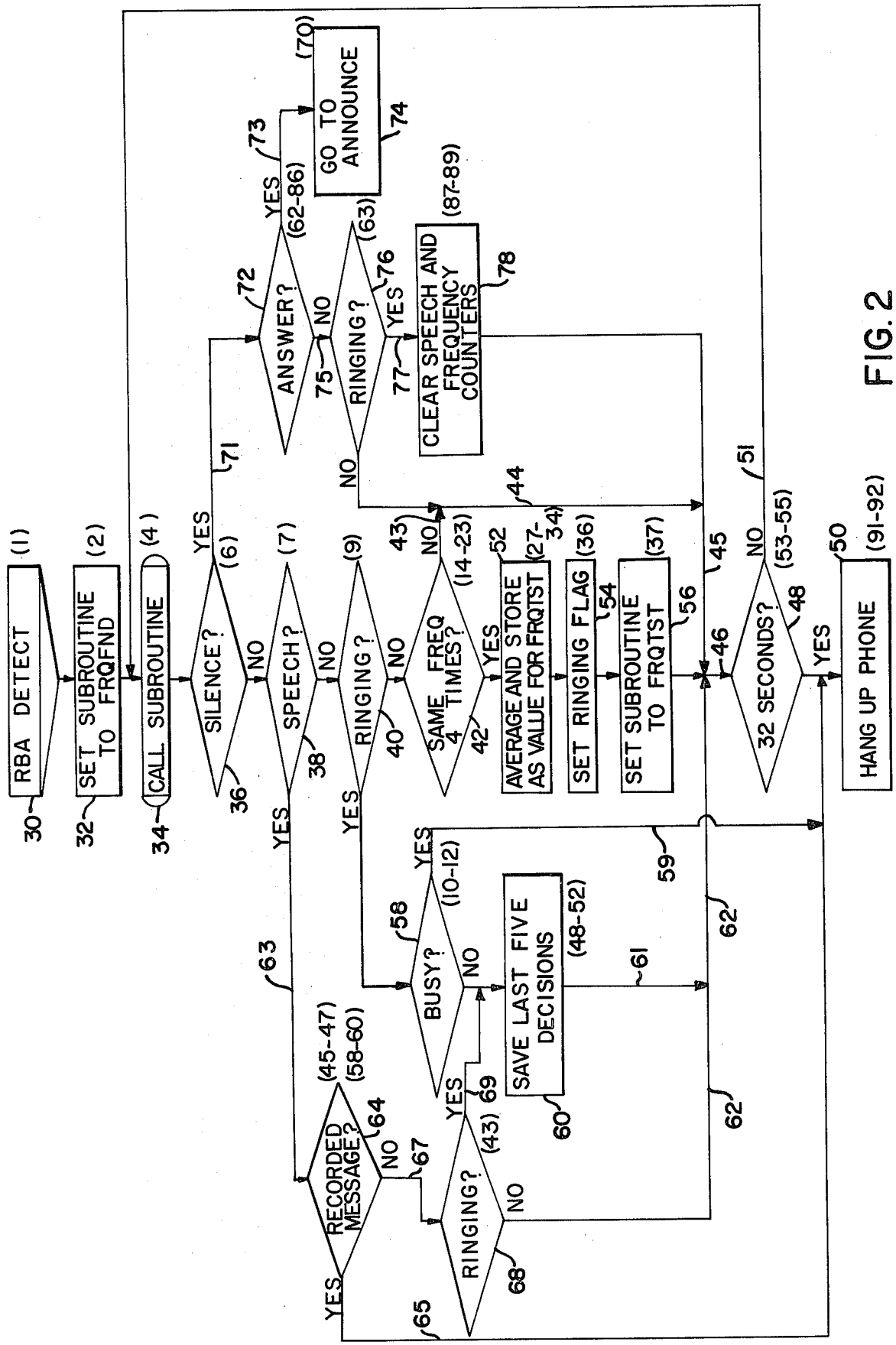
FIG. 2 is a functional flow diagram illustrating the operation of the embodiment of the invention shown in FIG. 1 under program control according to a main routine.

Referring now to FIG. 2, there is illustrated a functional flow diagram illustrating the operation of the embodiment of FIG. 1 under program control according to a main routine as illustrated therein. In the functional flow diagrams illustrated in FIG. 2, numerals in parentheses next to each element in the flow chart have been set forth and it will be understood by the reader that such numerals correspond to numbered program steps in the appendix attached hereto so that those of ordinary skill in the art may quickly ascertain appropriate correspondance between the functional flow chart illustrated and the actual program set forth and, in addition thereto, so that the actual steps of program corresponding to an element may be quickly located.

The main program, as indicated by the block 30, is entitled "RBA detect" and acts, as now will be appreciated by those of ordinary skill in the art, to detect ring, busy and announcement conditions on the line. When the main routine illustrated in FIG. 2 is entered, as indicated by the rectangle 32, it initially acts to set up the frequency find (FRQFND) sub-routine and thereafter, as indicated by the oval 34, this sub-routine is called. In essence, the mode of operation of the microprocessor means 12 is such that indirect branching is employed and, hence, a sub-routine is always initially set up and then it is called and entered in the manner indicated by the rectangle 32 and the oval 34.

The frequency find sub-routine will be discussed in greater detail in connection with FIG. 3; however, it is here sufficient to appreciate that the same is always set up when the main routine is entered and that within this sub-routine the microprocessor means 12 sits in a loop counting the time between interrupts until an interrupt occurs. After an interrupt is determined indirect branching to another routine known as Interrupt Request Count, as also described in detail in conjunction with FIG. 3, occurs whereupon a period timer maintained within the frequency find routine is checked to ascertain whether or not sixteen periods have been counted. If sixteen periods have not yet occurred, counting within the loop continues. However, if sixteen periods have been ascertained, the most common period within the last twelve periods is determined. This value is placed in a counter and thereafter a sub-routine referred to as frequency test (FRQTST) is set up and counting of periods continues. When the frequency test sub-routine is called in a succeeding cycle of interrupt, a similar set of sequential steps are employed to ascertain whether succeeding interrupts are the same as those previously determined. In this manner, the frequency find and frequency test routines are employed to ascertain whether or not incoming signals are periodic, non-periodic or non-existant. This is accomplished by counting the times between consecutive interrupts and comparing them to some value. Thus, in essence, it is sufficient for a reader to appreciate at this juncture of the description that the main routine calls, the frequency find and frequency test sub-routines, as fully described in connection with FIG. 3, to ascertain the nature of incoming interrupts and employs the results obtained through these sub-routines to determine the presence of rings, busy signals, recorded messages or answers. Accordingly, when the main routine is initiated, as indicated by the block 30, the frequency find sub-routine is set up and then called. The sub-routine stays in a counting loop until an interrupt occurs and, when an interrupt occurs, it will branch to a second sub-routine which comes back with an indication that we have a periodic signal whose period has been determined, a non-periodic signal indicative of speech and no signal for the predetermined interval indicative of silence.

If it is assumed, for purposes of description, that the RBA detect routine has just been entered subsequent to a telephone call being automatically dialed, it will be appreciated that the results of the frequency find sub-routine which was called in the manner indicated by the oval 34 would be insufficient to have made any determination as to the periodicity or non-periodicity of interrupts being monitored as no interrupts have yet occurred and hence the sub-routine is still in a loop counting time interval.

After calling the frequency find sub-routine as indicated by the oval 34, the program tests to ascertain whether or not a condition of silence is present as indicated by the diamond 36. This is determined, as shall be seen in conjunction with FIG. 3, by the timing out of a timer in the counting loop which indicates that no interrupt has been received in 750 milliseconds and this, in turn, is interpreted as silence. However, as under the conditions here being described, the automatic telephone call has just been made. The test indicated by the diamond 36 will be negative so that the main routine illustrated in FIG. 2 next proceeds to test whether or not speech has been detected as indicated by the diamond 38. As shall be seen in conjunction with FIG. 3, speech is detected as a function of the frequency test sub-routine as a result of a determination that a predetermined number of non-periodic signals have occurred. In any event, as we have here assumed that a telephone call has just been made, the test for speech indicated by the diamond 38 would be negative whereupon the program next tests to ascertain whether or not ringing has been determined in the manner indicated by the diamond 40.

The test for ringing is implemented by the program testing whether or not the ringing flag has been set in response to the frequency find or frequency test sub-routines, as described in connection with FIG. 3, as a result of the detection of a periodic signal. Since only a periodic signal is ascertained, it will be apparent that the ringing flag can be set in response to a ringing signal on the line, a busy signal or even a dial tone. However, as we are here assuming that a telephone call has just been made, it can be assumed that the ringing flag has not been set, as it takes approximately 400 milliseconds to determine frequency of a ring or busy signal in a manner which shall be set forth in greater detail below. Accordingly, as it is here assumed that the telephone call has just been made, the result of the test indicated by the diamond 40 will be negative as it is further assumed that ringing is just occurring and insufficient time has expired to detect the presence of a ringing signal.

Under these circumstances, the results of the test indicated by the diamond 40 will be negative and the program next proceeds to test whether or not the same frequency has been received four times, as indicated by the diamond 42. As was stated above, the frequency find sub-routine causes entry into the interrupt count routine which acts, in essence, to find the most common period of the last twelve interrupts ascertained. Once this value is determined, it is stored and each succeeding time the sub-routine or the frequency test sub-routine is entered, the frequency of the interrupt detected is compared with the value stored. If agreement with that previously stored is found, this value also is stored, However, if disagreement occurs, the previous value stored is dumped and a new value determined.

At any rate, each time agreement is reached on a consecutive basis, the value obtained and the number of times it has been obtained is stored in a counter and hence the test indicated by the diamond 42 is satisfied upon checking the state of the count in this counter to ascertain whether or not a value equal to or greater than four is stored therein. This value, as shall be seen hereafter, is employed to set the ringing flag. However, as it is here assumed that a call has just been made and hence that ringing is just being initiated, it must be assumed that the result of the test indicated by the diamond 42 is negative and hence the program proceeds in the manner indicated by the arrows 43-46 to test whether or not a 32 second interval has expired in the manner indicated by the diamond 48.

As will be seen in greater detail below, the timing loop associated with the frequency find and frequency test sub-routines includes a software timer which will time out upon the expiration of a 32 second interval. Whenever the timing out of this timer is ascertained and no announce routine has been initiated, the instant invention causes hang up to occur, as it is a fixed parameter of the program routine to hang up unless contact has been established and communication initiated within a 32 second interval. Thus, the main routine illustrated in FIG. 2 will always test the condition of this timer as indicated by the diamond 48 each time it is at an interim stage therein prior to looping back so that the time interval which governs the extent of a contact cycle may be checked to ascertain whether or not the same has expired. If the same has expired, as indicated by the arrow annotated "YES", a hang up sequence is initiated as indicated by the rectangle 50 whereupon the microprocessor means 12 will cause the off hook flip-flop means 22 to be reset to cause the system to hang up. Here, however, since it is assumed that the telephone call has just been made, the main routine will loop back in the manner indicated by the arrow 51 annotated "NO" to recall the sub-routine indicated by the oval 34. This sub-routine, it will be appreciated, is either the frequency find sub-routine initially set up by the rectangle 32 or a frequency test sub-routine as also described in connection with FIG. 3 which is established by either the main routine illustrated in FIG. 2 or a previous cycling of the frequency find sub-routine.

Since it has been assumed that the telephone call has just been initiated and, if it is further assumed for the purposes of this explanation that a ringing signal as distinguished for instance from speech, is first encountered by the program; it will be appreciated that the sequence of operations just described together with the results therefor associated with the elements 34, 36, 38, 40, 42-46, 48 and 51 will be repeated until such time as a cycling through this main routine as well as the frequency find and frequency test sub-routines result in a determination that the same frequency has been detected four times in the manner indicated by the diamond 42.

It should be noted, at this juncture, that alternate conditions wherein the phone is answered prior to any detection of ringing is possible. However, such alternate conditions will be described in association with other portions of this routine where such alternate conditions are, in fact, analyzed and detected. Here, it is sufficient to appreciate that the main routine will continue cycling through the portion of the loop just described until such time as the frequency find sub-routine has determined the most common period of the last twelve interrupts received and at least 3 more indications of the presence of this frequency are received in a consecutive manner. Under these conditions, the test indicated by the diamond 42 will cause an affirmative result upon the checking of the registers within the microprocessor that maintains such information and the program will next proceed, in the manner indicated by the rectangle 52, to average and store the frequency obtained as a value for frequency testing. Thus, once a frequency is determined by frequency test and it is received an additional three times in succession, the program assumes that this frequency is representative of the incoming frequency on the telephone line and, therefore, the same is averaged within the ALU of the microprocessor means 12 and stored in a register for use within this program and for the frequency test sub-routine. Thereafter, as indicated by the rectangle 54, the ringing flag is set and the frequency test sub-routine is set in the manner indicated by the rectangle 56. Thereafter, as indicated by the arrow 46, the condition of the thirty-two second timer is again checked and, if it is assumed that the same has not timed out, the program loops back to call the sub-routine in the manner indicated by the oval 34. It should be noted that, at any time, the thirty-two second timer times out as indicated by an affirmative result from the test indicated by the diamond 48, a hang up routine as indicated by the rectangle 50 will be initiated.

Upon a calling of the sub-routine, in the manner indicated by the oval 34, the frequency test sub-routine which was previously set in response to the step indicated by rectangle 56 is called. This sub-routine will be described in much greater detail in connection with FIG. 3. However, it is here sufficient to appreciate that the frequency test sub-routine sets the interrupt handler to Compare and continues counting intervals between interrupts. However, when an interrupt is generated by the interrupt, flip-flop means 8 the interrupt sub-routine established acts in effect to assume that the frequency previously determined under frequency find is the proper frequency and thereafter proceeds to evaluate the interrupts from the standpoint of whether or not they compare with the frequency previously ascertained. After the sub-routine is called in the manner indicated by the oval 34, the main routine will again test for silence and speech in the manner indicated by the diamonds 36 and 38 with a negative result in each case since it has been assumed that neither have yet occurred. However, when the test for ringing indicated by the diamond 40 is initiated through a testing of the condition of the ringing flag, as aforesaid, an affirmative result will now occur since this flag was set in a preceding cycle through this routine in the manner indicated by the rectangle 54. Under these conditions, it will be appreciated that the affirmative result associated with the set ringing flag is indicative that a periodic frequency has been determined. However, such frequency could be a ringing signal, a busy signal or even a dial tone.

The case of a dial tone may be discounted since the same will not persist for a sufficient interval to cause the program to go to an announce routine and hence, under worst conditions, the main routine would go through a hang up procedure. However, the presence of a busy signal must be determined. For this reason, the test indicated by the diamond 58 is initiated to ascertain whether or not a busy signal is, in fact, present. The test indicated by the diamond 58 is conducted by the microprocessor, under program control, based on the nature of a ring signal, a busy signal, and the manner in which the program detects silence.

More particularly, as aforesaid, the timing loop established both by frequency find and frequency test subroutines intermediate the receipt of interrupts continues to time the interval between interrupts in a manner which will be described in greater detail in connection with FIG. 3. Furthermore, as was stated above, silence is defined as an interval of at least 750 milliseconds or $\frac{3}{4}$ of a second between interrupts and the presence of this condition will be indicated by a counter within the timing loop. In addition, as will be readily appreciated by those of ordinary skill in the art, while the nature of ring and busy tones do vary somewhat among various telephone systems, a ring signal is generally characterized by a two second on time followed by a three second off time, or the like, while a busy signal is characterized by a half-second on time followed by half-second off time. Therefore, the test indicated by the diamond 58 may simply be implemented by establishing a counter which counts each interrupt as it arrives and is cleared each time the timing loop makes a determination as to the presence of silence. Under these conditions, it will be readily appreciated that, if a busy signal is present, the counter will continue to count each interrupt as it arrives while, if a ringing tone is present, the counter will be cleared during each interval of silence.

Accordingly, such a counter is established within the microprocessor means 12 and an arbitrary state of the count of seventy-two thereof is assigned. In this manner, the test for a busy signal as indicated by the diamond 58 is simply implemented by checking the state of the counter to ascertain whether or not the state of the count therein is seventy-two or greater. If such a condition obtains a busy signal is clearly present whereupon an affirmative result occurs in the manner indicated by the arrow 59 and a hang up sequence is initiated as indicated by the rectangle 50. If the state of the counter, when tested in the manner indicated by the diamond 58, is less than seventy-two, no busy signal is present. Therefore, under these conditions, the last five decisions are saved in the manner indicated by the rectangle 60 and thereafter in the manner indicated by the arrows 61 and 62, the condition of the thirty-two second timer is tested and, assuming the same has not timed out, the program loops back to again call the sub-routine in the manner indicated by the oval 34. It should be noted that with respect to rectangle 60, the five decisions which are saved correspond to the last five frequency determinations made under program control. More particularly, since it will be appreciated that a setting of the ringing flag required the presence of four frequency detections which were identical, the last five decisions saved in the manner indicated by the rectangle 60 will involve the four values obtained to set the ringing flag as well as the next succeeding value obtained by the sub-routine called.

Now that the main routine has ascertained that a periodic signal is present, which is not a busy signal, it will continue to cycle through the busy loop established until such time as the called routine, which is now the frequency test routine, establishes that either speech or silence is present. The first interval associated with making such a determination that a periodic signal which may correspond to ringing or a busy signal is, in fact, present will take approximately 400 milliseconds, depending upon the frequency of the signals being tested. If it is further assumed, for purposes of this discussion, that a ringing signal, which is not a busy signal was, in fact, ascertained so that no hang up routine is issued, it will be seen that if the telephone is not answered within the thirty-two second interval established by the loop timer associated with the test indicated by diamond 48, a hang up routine will be issued in the manner indicated by the rectangle 50 upon an expiration of this predetermined period. However, for purposes of this discussion, it will be assumed that a more normal sequence of events occurs in that, after ringing is detected, the phone is answered, a salutation is placed on the telephone line and, if such salutation is not of the type provided by a recorded message or the like, an interval of silence will occur to permit the calling party to state his message.

Under these circumstances, when the phone is answered, ringing will be set and the called sub-routine indicated by the oval 34 will be the frequency test sub-routine which looks to ascertain whether the signal being received corresponds to the periodic signal previously ascertained or is another signal which is classified as not periodic and hence speech. When this occurs, the answer will be detected by the frequency test sub-routine in a manner to be described below and thereafter, as the main routine proceeds, the test associated with diamond 36 will retain its negative condition. However, the test for speech indicated by the diamond 58 will now be affirmative. More particularly, a condition where speech is detected is ascertained by a sampling of a speech detection counter associated with the frequency test routine which effectively is incremented each time the frequency of an interrupt being sampled is different than the frequency of the periodic signals ascertained during the frequency find routine. Thus, while such frequency may, in fact, be other than speech it is treated as if it were speech.

When an affirmative result from the test indicated by diamond 38 occurs, the main routine branches in the manner indicated by the arrow 63, annotated YES, to test for the presence of a recorded message in the manner indicated by the diamond 64. As will be appreciated by those of ordinary skill in the art, a recorded message is characterized both by a length which is substantially greater than that normally associated with a salutation, even should such salutation involve answering by a reception center of a commercial concern and by an absence of gaps within a lengthy message which would normally occur should such lengthy message not be previously prepared. Hence, these characteristics may be relied upon to determine whether a contacted telephone set has been answered by a recording device and the message being set forth is, in fact, a prerecorded message.

As was stated above and shall be seen in connection with the discussion of FIG. 3 below, the frequency test routine involves the incrementing of a counter, called a speech detection counter, whenever incoming interrupts do not coincide with the frequency of the periodic signal ascertained in the frequency find routine. Furthermore, as shall be seen below, the incrementing of this counter occurs in such manner that the same is not quickly incremented in response to a short salutation and its incrementing is stopped for gaps which would normally occur were a salutation being set forth by an individual. Under these conditions, the test for a recorded message associated with the diamond 64 involves checking the state of the count in the speech detection counter, as aforesaid, to ascertain whether the count therein exceeds first or second values.

More particularly, if ringing has been set, which is the case here assumed, the called sub-routine is strictly the frequency test sub-routine which is much faster than the frequency find sub-routine in that the same need not await sixteen periods nor find the most common period of the last twelve. Under these conditions, if a recorded message is present, the speech detection counter will be incremented at a much higher rate and hence the test indicated by the diamond 64 checks to ascertain whether or not the state of the count in the speech detection counter equals or exceeds thirty-one which is an arbitrary value which has been shown to be sufficient for this purpose. However, there will be cases where ringing has not been detected and no ringing flag set since ringing tones on the line do not coincide with the ringing of a telephone handset and hence the telephone handset could, in fact, be answered before any ringing signal on the line is detected by the system. Under these circumstances, the called routine will initially be the frequency find routine although the frequency test routine is subsequently entered therefrom. Therefore, if no ringing flag has been set, the test for a recorded message indicated by the diamond 64 checks to ascertain whether or not the state of the count in the speech detect counter is equal to or greater than fifteen. Accordingly, if speech is detected and the ringing flag has been set, a test for a recorded message involves checking the count in the speech detector counter to ascertain whether or not the same equals thirty-one or more while, if the ringing flag has not been set, the state of the speech detector counter is evaluated to ascertain if the same is equal to or greater than fifteen.

Whenever the test associated with the diamond 64 is indicative that a recorded message is present as indicated by the arrow annotated 65, a hang up routine is initiated in the manner indicated by the rectangle 50 so that the prerecorded announcement issued by the automatic dialing equipment being described herein is not issued in response to answering by a recording device. If, however, no recorded message is ascertained, as indicated by the arrow 67 annotated NO, the program next tests to ascertain, in the manner indicated by the diamond 68 whether or not the ringing flag has been set. This test is performed in precisely the same manner described in conjunction with the diamond 40. If the ringing flag has not been set in the manner indicated by the arrow 62 annotated NO, the thirty-two second timer is again tested in the manner indicated by the diamond 48 to ascertain whether or not the time period established for the calling sequence has expired. If the same has not expired, as indicated by the arrow 51, the appropriate sub-routine is again called as indicated by the oval 34 while, if the period has expired, a hang up routine as indicated by the rectangle 50 is again initiated.

If the ringing flag has been set, as indicated by the arrow 69 annotated YES, the program is in a phase where, in all probability, ringing has been established and the telephone has been answered. Accordingly, it must await an indication of silence before proceeding further. Therefore, as indicated by the arrow annotated 69, the last five decisions as to incoming frequency are saved through an updating of the appropriate register with the last frequency ascertained in the manner indicated by the rectangle 60 and explained above. Thereafter, as indicated by the arrows 61, 62 and 46, the thirty-two second timer is again tested to ascertain whether the predetermined period for calling has expired. If the period has expired, a hang up routine is again initiated, as indicated by the rectangle 50 while, if the period has not expired, the appropriate sub-routine, which clearly is the frequency test routine, is again called and looping through the main routine illustrated in FIG. 2 is continued.

Under the conditions assumed above, the answering party will issue a salutation and thereafter pause to receive the callers message. At this juncture, the test indicated by diamond 36 will be affirmative and the routine will stop cycling through the speech detected loop previously described. The test for silence is implemented, as aforesaid, by testing the condition of a counter within the timing loop for timing intervals between interrupts and, more particularly, requires that the state of a counter therein indicate that 750 milliseconds or ¾ of a second has expired from the receipt of the last interrupt. When this condition obtains the test for silence will be affirmative in the manner indicated by the arrow 71 and the system will test in the manner indicated by the diamond 72 as to whether or not an answer is present. The test indicated by the diamond 72 annotated ANSWER involves a series of steps, which has been simply illustrated as the single diamond to facilitate explanation; however, the full appreciation for the tests involved may be obtained through direct reference to instructions 62–86 of the annotated program attached hereto as an appendix.

APPENDIX

PROGRAM EXHIBIT

```
A program that monitors a comparator output and determines
whether the input signal is (1) a busy signal, (2) a recorded
message, (3) a ring signal or (4) an answered telephone.

In cases (1) and (2) it hangs up immediately.

In case (3) it hangs up after 32 seconds.

In case (4) it turns on a recorded announcement.
```

This routine is entered after dialing. It calls FRQFND and FRQTST and uses the results to decide what is on the line. It exits to HANGUP or to ANNOUNCE.

```
 1 RBADET  LDX     FRQFND      Go to FRQFND until RINGING.
 2         STX     *WHERE
 3 GO      LDX     *WHERE
 4         JSR     X
 5         TST B
 6         BEQ     DECIDE      B=0, silence.
 7         BPL     SPEECH      B>0, speech.
 8         LDA B   *BUSY       Here if frequency detected.
 9         BPL     FNORNG
10         LDA A   *FDET       If ringing, just count and hang up
11         CMP A   #72         at 72. This is a busy signal.
12         BEQ     ZNOANS
13         BRA     FNDCNT
```

Here if FREQ but no RING.

```
14 FNORNG  LDX     #FIRST      Check for 4 values within ±2 of
15         LDA A   *VALUE      first.
16         TAB                 Get value in A and B
17         SUB A   *FIRST      diff in A.
18         BPL     POS
19         NEG A               |diff| in A.
20 POS     SUB A   #3
21         BPL     NEW         |diff| ≤ 2?
22 LP      LDA A   X           Yes. Use it.
23         BEQ     STORE       Find last location.
24         INX
25         CPX     #FOURTH
26         BNE     LP
27         ADD B   *SECOND     Here if this is 4th value.
28         LSR B               B = 1/2 (2nd + 4th).
29         ADD A   *FIRST
30         LSR A               A = 1st + 3rd.
31         INC A               A = 1/2 (1st + 3rd).
32         ABA                 A = 1/2 (1st + 3rd) + 1.
33         LSR A               A = 1/4 (1st + 2nd + 3rd + 4th + 2).
34         STA A   *VALUE
35         LDX     #FRQTST     Set Ringing and hereafter go to
36         STX     *BUSY       FRQTST.
37         STX     *WHERE
38         BRA     TIME        Check 32 seconds.
39 NEW     STX     *SECOND     Clear 2nd and 3rd locations.
40         STX     *THIRD
41 STORE   STA B   X           Store new period in 1st.
42         BRA     TIME
```

Here if SPEECH.

```
43 SPEECH  LDA A   *BUSY
44         BPL     SNORNG      Check for RING.
45         LDA B   *SCOUNT     Check for recorded message.
46         CMP B   #31
47         BEQ     ZNOANS
48 FNDCNT  LDX     *THIRD
49         STX     *FOURTH     Save last 4 and store this
50         LDX     *FIRST      one. If A POS freq, A NEG speech.
51         STX     *SECOND
```

```
52            STA A    *FIRST
53  TIME      LDA A    IN1         Check for 32 seconds elapsed.
54            AND A    #32SEC      If so hang up.
55            BNE      NOANS
56            LDA A    #80
57            BRA      GO
58  SNORNG    LDA A    *SDET
59            CMP A    #15         Not RINGING. If 15 speech,
60  ZNOANS    BEQ      NOANS       hang up. This is a recorded message.
61            BRA      TIME
```

Here if 750 ms silence. Must decide if RING or ANSWER.

```
62  DECIDE    LDA A    *BUSY
63            BMI      RING        Check RINGING.
64            LDA A    *SCOUNT     No. Get SCOUNT.
65            SUB A    #2          Ignore. S = 0, 1, 2.
66            LDA B    *FCOUNT     Ignore. F = 2S - 4.
67            LSR B                Accept. F = 2S - 5.
68            SBA
69            BLE      TIME        If not speech do not clear ctrs.
70  GOANN     BRA      ANNOUN
71  RING      LDX      #FIRST      Answer if 4 of last 5 speech or
72            LDA A    #-8         S > 4 and S > F.
73  LP        LDA B    X
74            BPL      NO
75            LSR A
76  NO        INX
77            CPX      *SIXTH
78            BNE      LP
79            BCS      GOANN       If 4 shifts answer.
80            LDA A    *SCOUNT     A = SCOUNT.
81            SUB A    #5          A = S - 5.
82            BMI      SKIP        If S < 5 no answer.
83            LDA B    *FDET       S > 4. A = S - 5.
84            SUB B    #4          B = F - 4.
85            SBA                  A = S - F - 1.
86            BPL      GOANN       If S - F - 1 > 0, answer.
87            STX      *FIRST      Set 1st and 2nd pos.
88            STX      *FDET       Clear F and S count.
89            STX      *SCOUNT
90            BRA      TIME
91  NOANS     CLR B                Set B for call made but incomplete.
92            BRA      HANGUP
```

This routine tests for a specific frequency. It is used in PBADET to look for the RING frequency and by RESPON to look for dial tone.

```
93  FRQTST    STA A    *QUIET      Set 750 ms timer.
94  VALSET    LDX      #IRQCMP     Set IRQ address.
95            STX      IRQV
96            CLR A
97            STA A    *BADCT      Clear counters.
98            STA A    *GOODCT
99  END       BRA      ENDIV
```

This routine sets up the previous routines to detect frequencies or speech. If 750 ms of silence it returns with B = 0 and Z set.

```
100 FRQFND    STX      *SSAV       Save stack pointer.
101           LDX      #IRQCNT
```

```
102              STX      *IRQV      Set for IRQCT.
103              LDX      #START
104              STX      *XCSAV
105              STX      *NOISE     Set 750 ms timer.
106  INDIV       LDS      *SSAV      Recover stack.
107              CLR A               Clear counter.
108              CMP A    IN1        Reset IRQ F/F.
109              CLI                 Enable IRQ.
110  FCTR        LDA B    #4
111  LPF         DEC B
112              BNE      LPF
113              INC A
114              BPL      FCTR       64 μs/count.
115  SCTR        LDX      #288
116  LDS         DEX
117              BNE      LDS
118              INC      QUIT       4.6 ms/count.
119              BNE      SCTR
120              SDI
121  RETURN      LDS      *SSAV      Recover stack.
122              RTS                 Return.
```

This routine stores 16 periods acceptable by FILTER. It then finds the period of maximum occurrence and stores it in VALUE.

```
123  IRQCNT      BSR      FILTER     Check for high or low frequency.
124              LDX      *XCSAV     OK.
125              STA A    X          Store in next location.
126              INX
127              STX      *XCSAV
128              CPX      #LAST
129              BNE      END        16 periods found?
130  COUNT       LDX      *FIRST-1   Point to start.
131              CLR      CTR
132  LP          INX
133              CPX      *XCSAV     Done?
134              BEQ      VALSET
135              STX      *XSAV      No. Save X.
136              LDA B    X          Get next value.
137              CMP B    *VALUE     This checked yet.
138              BEQ      LP         If so skip it.
139              CLR A
140              LDX      #FIRST-1   Clear counter and start at beginning.
141  LPCT        INC A               If good A = A+1.
142  NO          INX                 X = X + 1.
143              CPX      *XCSAV     Done?
144              BEQ      NEXT
145              PSH B               No. Save B.
146              SUB B    X          B = diff.
147              BPL      POS
148              NEG B
149  POS         LSR B               B = 1/2 diff.
150              PUL B               Recover B.
151              BEQ      LPCT
152              BRA      NO         Not useable - continue.
153  NEXT        CMP A    *CTR       If new count bigger than
154              BLS      OLD        old, keep new.
155              STA A    *CTR
156              STA B    *VALUE
157  OLD         LDX      *XSAV      Recover X for next value
158              BRA      LP         and continue.
```

This routine compares periods acceptable by FILTER with VALUE and considers all within ± 128 µs as good. If 11 good are found FDET is incremented and return is with N set. If 22 bad, it exits with Z and N reset.

```
159 IRQCMP  BSR     FILTER
160         INC A
161         INC A
162         SUB A   *VALUE    A = C-V+2.
163         BMI     BAD
164         SUB A   #5        A = C-V-3.
165         BPL     BAD
166         LDA B   *GOODCT
167         ADD B   #12
168         STA B   *GOODCT
169         BPL     ENDIV
170 FFOUND  INC     FDET
171         BRA     RETURN
172 BAD     LDA B   *BADCT
173         ADD B   #6
174         STA B   *BADCT
175         BPL     ENDIV
176         INC     SDET
177         LSR B             Set B positive.
178         BRA     RETURN
```

This routine ignores all frequencies less than 160 Hz and more than 1.7 KHz. It also considers any 256 interrupts as noise.

```
179 FILTER  INC     NOISE
180         BNE     OK
181         COM B             Set B negative.
182         BRA     FFOUND+3
183 OK      CMP A   #10       Ignore more than 1.7K.
184         BMI     ENDIV
185         TST A
186         BMI     ENDIV     Ignore less than 120 Hz.
187         RTS
```

SYMBOL   TABLE   RBADET

```
COUNT   130
DECIDE   62
END      99
ENDCNT   48
ENDIV   106
FFOUND  159
FILTER  179
FNORNG   14
FRQFND  100
FRQTST   93
GO        3
GOANN    70
IRQCMP  159
IRQCNT  123
NEW      39
NOANS    91
RBADET    1
RETURN  121
RING     71
SNORNG   58
SPEECH   43
STORE    41
TIME     53
VALSET   94
ZNOANS   60
```

More particularly, as an affirmative indication associated with the test for silence indicated by the diamond 36 merely indicates that a ¾ second interval has expired without an interrupt, it will be appreciated that such interval may indicate that the phone has been answered, a salutation has been uttered and now the receiving party is awaiting a response or, alternatively, such ¾ second period of silence may merely be associated with a ringing signal on the line. Therefore, the first step associated with testing for an answer, as indicated by the diamond 72, is to ascertain whether or not the ringing flag has been set. If the ringing flag has been set, a decision is made as to whether or not the program is dealing with an answer condition on one of two alternative approaches, both of which require a previous detection of speech to confirm that factually the program is dealing with a condition where ringing has taken place, the telephone was answered, speech was detected and now the period of silence is associated with the receiving party's awaiting a response.

Accordingly, if the ringing flag has been set, the program first checks to ascertain if four of the last five decisions related to non-periodic interrupts. Since the last five decisions regarding the frequency of the incoming interrupts were saved in the program step of FIG. 2 associated with the rectangle 60 and the value for the periodic frequency was stored in the program step associated with rectangle 52, it will be seen that this test may be simply implemented by the microprocessor through a comparison of the last five decisions saved with the value of the periodic signal. If four of the last five decisions saved were other than the periodic frequency, an answer condition is assumed and the program proceeds to an announce routine in the manner indicated by the arrow 73.

If, however, four of the last five decisions saved are not speech, the program will next check the state of the speech detector counter and the frequency detect counter, maintained as a part of the frequency test sub-routine, as aforesaid, to ascertain if the condition associated therewith, in fact, indicates that a condition is present wherein the phone has been answered and a response is being awaited. More particularly, the state of the speech detect counter and the frequency detect counter are sampled and, if the state of the speech detect counter is equal to or greater than five and the count in the speech detect counter is greater than the count in the frequency detect counter, the appropriate conditions for an announce response are viewed as present. Therefore, under these conditions too, an affirmative result from the test indicated by the answer diamond 72 is indicated in the manner associated by the arrow 73 annotated YES.

If the initial check of the state of the ringing flag associated with the diamond 72 is indicative that ringing has not yet been confirmed, the period of silence determined by the affirmative result from the test associated with diamond 36 may indicate that such silence is associated with ringing. However, a condition where the phone was answered prior to a detection of ringing on the line may have also occurred. Therefore, under these conditions, it is necessary that the test associated with diamond 72 determine whether or not sufficient speech has been detected to indicate that the telephone has effectively been answered and the period of silence detected, in fact, is indicative of an individual awaiting a response. To achieve this, the program relies upon an empirical comparison of the state of the counts in the speech detection counter and the frequency detect counter as maintained as part of the frequency test sub-routine, as aforesaid.

More particularly, the state of the speech detect counter is tested and, if the same is at least three and the state of the frequency detect counter is less than two times the state of the speech counter minus four (2S-4), the program has determined that an announce condition exists and hence proceeds in the manner indicated by the arrow 73. In this last regard, it should be noted that, under conditions where a phone is answered prior to a detection of ringing on the line and the answering party utters only a single "hello" and then awaits a response, the test requiring the state of the speech detect counter be three and the frequency detect counter be less than two times the speech counter minus four will probably fail. However, if in the ensuing period of silence the answering party issues a second "hello", this result will be summed, in a manner to be described below, with the previous amount of speech detected and will undoubtedly cause an announce operation to be initiated in the next succeeding cycle of the main routine illustrated in FIG. 2.

Anytime that the tests associated with the answer diamond 72 are affirmative, in the manner indicated by the arrow 73 annotated YES, the system goes to an announce mode of operation, as indicated by the rectangle annotated 74. When this routine is entered, the microprocessor means 12 will cause the answer flip-flop 154 to be set whereupon a prerecorded message will be played back on the telephone line. Additionally, provisions may also be made for recording any response the answering party may have to such message. While the instant disclosure is being set forth in an environment where the same, in essence, represents an improvement over the disclosure of U.S. Pat. No. 4,160,125, it should be appreciated by those of ordinary skill in the art that an alternate embodiment may be employed wherein the entire system is controlled by the microprocessor means 12 so that playback would be directly controlled thereby as well as initial dialing. Subsequent to the playback of the prerecorded message, a hang up routine would obviously be entered.

When the tests associated with the answer diamond 72 are negative, as indicated by the arrow 75 annotated NO, the system next tests, as indicated by the diamond 76, whether or not the ringing flag has been set. This is here done so that the program may ascertain whether the period of silence, which has now been determined not to be associated with an answer, is a period of silence associated with ringing or the like or, alternatively, is the result of an answer which has been acquired prior to obtaining a ringing signal on the line yet is of such short duration that it has not resulted in sufficient incrementing of the speech detect counter maintained within the frequency test sub-routine as aforesaid. The tests for ringing indicated by the diamond 76 is implemented in precisely the same manner described above for other ringing tests and involves only checking to ascertain whether or not the ringing flag has been set. If the ringing flag has not been set, as indicated by the arrow 44 annotated NO, we may be dealing with a condition where the party answered the telephone before ringing on the line was detected and said only a single "hello". Under these conditions, the program wishes to maintain the speech detect counter associated with the frequency test sub-routine in its previously established condition so that further incrementing, when the party again repeats their salutation, will result. Accordingly, when the ringing flag is not set, the program next tests to ascertain whether the thirty-two second interval timer has expired and will either hang up or return to the called sub-routine, depending upon the result thereof, in the manner previously described. However, if the ringing flag has been set in the manner indicated by the arrow 77 annotated YES, the speech and frequency counters are cleared in the manner indicated by the rectangle 78, as the program is clearly not dealing with a condition of uncertainty with regard to ringing and hence the normal tests for the presence of speech over frequency detections must be met in the next loop, as the period of silence was thus clearly part of the ringing signal and anything in these counters may be viewed as erroneous for purposes of further cycles through the main routine. After the speech and frequency counters have been cleared in the manner indicated by the rectangle 78, the program proceeds in the manner indicated by the arrows 45 and 46 to test the state of the thirty-two second timer to ascertain whether or not the period for the phone to be answered has expired. If the same has expired, the phone is hung up in the manner indicated by the rectangle 50 while, if the period has not elapsed, the called sub-routine, which in this case will be frequency test, is again re-entered at the beginning portion of the main sub-routine associated with the oval 34.

Referring now to FIG. 3, there is shown a functional flow diagram illustrating various sub-routines employed in branch operations of the main routine and, more particularly, FIG. 3 illustrates the frequency find, frequency test, interrupt count, interrupt compare and timing loop operations employed in the maintenance and establishing of various registers employed for purposes of the main routine illustrated in FIG. 2. Since the main routine illustrated in FIG. 2 acts initially to set up the frequency find sub-routine, this routine will first be described and the description will be initiated at the top left-hand corner of FIG. 3. As aforesaid, the microprocessor means 12 employs a branch indirect mode of operation so that before a sub-routine can be called, its address must be set up in memory. As was the case for FIG. 2, direct reference between the functional flow chart illustrated in FIG. 3 and the program set forth in the appendix is facilitated by the placement of appropriate program step numbers in parentheses next to the appropriate blocks within the flow chart depicted.

The frequency find sub-routine, as indicated by the block 80 annotated FRQ FND, acts solely in the manner indicated by the rectangle 82 to set up the interrupt handler to Count so that the next succeeding interrupt request generated by the interrupt request flip-flop means 8 is handled by the related IRQCNT routine indicated by the block 84. Thus, in the same manner as all indirect branch operations which occur herein, the frequency find sub-routine, when entered, only acts to store the address of the interrupt request count routine, which is related thereto, so that upon generation of the next interrupt request by the interrupt request flip-flop 8, this interrupt request handler is called. Thus, while it was previously stated that the frequency find sub-routine acts to evaluate the rate at which interrupt requests are being generated to determine a value, which is to be viewed as the periodic signal, it will now be appreciated that this is effectively done by the interrupt request count routine indicated by the block 84 which is effectively set up by the frequency find sub-routine.

Once the frequency find sub-routine sets the interrupt handler to count, in the manner indicated by the rectangle 82, the routine enters the main timing loop whose entry point is indicated by the circular flag A, in the manner indicated by the arrows 85 and 86. The timing loop, which is indicated by the circular flag A, acts to maintain and update two software timers whose purpose is to monitor and time the periodicity of incoming interrupt requests so that the condition of these timers may be used as an indication of the frequency of incoming interrupt requests for purposes of ascertaining when requests are falling within a range wherein they might represent valid information to be analyzed and, in addition thereto, when the spacing between interrupt requests is such that a condition of silence is indicated. More particularly, a first timer, referred to as the period timer, keeps track of the interval between interrupts, it being noted that should this period be too large, the frequency of the interrupt is too low to represent valid information or, alternately, if the period is too low, the frequency is too high to represent information of the type to be analyzed. Similarly, a second software counter, referred to as the silence counter, keeps track of large increments between interrupts so that the occurrence of a ¾ second or 750 millisecond interval, in which no interrupt request is generated to indicate a period of silence, can be determined.

When the timing loop indicated by the circular flag A is entered, the period timer is cleared in the manner indicated by the rectangle 88 so that, upon each entry to the timing loop, the period timer is reset to zero. Thereafter, as indicated by the rectangle 90, the period timer is incremented every sixty-four microseconds to effectively measure the time interval between the last interrupt request which cleared the timer and that which should subsequently occur. Each time the period counter is incremented, in the manner indicated by the rectangle 90, the state of the count therein is checked, in the manner indicated by the diamond 92, to ascertain whether or not the state thereof is equal to or greater than one hundred and twenty-eight. If the state has not yet reached one hundred and twenty-eight, as indicated by the arrow 93 annotated NO, the timing loop reverts back to the step indicated by the rectangle 90 where the period counter is again incremented at the expiration of sixty-four microseconds. This will continue until the test indicated by the diamond 92 is affirmative. As will be seen in the filtering routine described in conjunction with FIG. 4, once the state of the period counter exceeds one hundred and twenty-eight, it is indicative that incoming frequencies are too low to represent worthwhile information. Thus, such interrupt requests may indicate noise on the line such as sixty cycle or, alternatively, a period of silence may be occurring.

At any rate, once the state of the period counter reaches one hundred and twenty-eight, as indicated by the arrow 94 annotated YES, a second counter herein referred to as the silence counter, is incremented each 4.6 milliseconds, in the manner indicated by the rectangle 95. The state of this counter, it will be recalled, is sampled in determining whether or not a period of silence is present in the test indicated for the diamond 36 of the main routine illustrated in FIG. 2. Each time that the silence counter is incremented, the state of the count therein is tested in the manner indicated by the diamond 96. Should the results of this test indicate that the state of this counter is not yet two hundred and fifty-six, the timing loop loops back in the manner indicated by the arrow 97 annotated NO so that the silence counter is again incremented at the expiration of the 4.6 millisecond interval. This continues until the state of the count therein reaches two hundred and fifty-six at which time, as indicated by the arrow 98, a return to the calling routine occurs in the manner indicated by the oval flag 99. It will be appreciated by those of ordinary skill in the art that appropriate timing for incrementing each of the counters disclosed herein is provided from the system clock and various divisions thereof. It should also be noted that the incrementing of the silence counter does not start at zero but at a level so that a count of two hundred and fifty-six therein corresponds to the ¾ second interval required for silence.

In a similar manner, the frequency test (FRQ TST) routine, as indicated by the block 100, acts when called to set the interrupt handler to the interrupt compare sub-routine, as indicated by the rectangle 102. This involves storing the address for the interrupt request compare routine (IRQCMP) so that the same is accessed in response to the occurrence of the next succeeding interrupt request. The interrupt request compare routine acts, in essence, as shall be described below, to compare the frequency of incoming interrupt requests with the frequency which was determined as the periodic frequency during the interrupt request count routine. The interrupt request compare routine is indicated by the block 104 and shall be described hereinafter.

Once the frequency test routine sets the interrupt handler to compare, in the manner aforesaid, it returns as indicated by the arrows 105 and 106 to entry point A in the timing loop whereupon the period timer is cleared, in the manner indicated by the rectangle 88, and thereafter incrementing of the period timer and the silence counter occurs, in the manner indicated by the rectangles 90 and 94, as aforesaid.

When the zero crossings of an input signal on the telephone line cause the interrupt request flip-flop means 8 to generate interrupt requests, as aforesaid, the actual processing of such interrupt requests occur as a function of the interrupt handler whose address was stored by the frequency find or frequency test sub-routines originally set up, it being recalled that the main routine illustrated in FIG. 2 initially sets up the frequency find sub-routine and thereafter sets up the frequency test sub-routine upon a determination that a ringing condition is present. When the frequency find sub-routine is called, its purpose is to look at what is coming in on the telephone line, determine if such signal is periodic and determine the period thereof. Thereafter, if the same input occurs four times in succession, the main program assumes that this periodic signal is what is, in fact, on the line and hence what is suppose to be on the line. Thereafter, the frequency test routine is employed to compare what is presently coming in on the telephone line with the signal which the frequency find routine has defined as what is supposed to be on the line and the number of valid and invalid comparisons are noted for purposes of determining the nature of the response on the telephone line being obtained.

When the frequency find sub-routine is called by the main routine, it acts to set the interrupt handler to count, in the manner indicated by the rectangle 82, as aforesaid. Thereafter, the next interrupt request generated by the interrupt request flip-flop means 8 will be processed in accord with the interrupt request count routine indicated by the block 84. More particularly, when the interrupt request count routine is called to act as an interrupt handler, it first acts to call the filter routine in the manner indicated by the oval 108. This sub-routine is described in greater detail in connection with FIG. 4. Here, however, it is sufficient to appreciate that the filter sub-routine called acts effectively to limit interrupt requests which the interrupt request count routine and the interrupt request compare routine may look at to those which are viewed as capable of representing valid information. Thus, the filter routine acts to define a passband of frequencies which may contain valid information and causes all interrupt requests, which occur at frequencies outside of this passband, to be rejected. The filter routine thus may be viewed as a software implementation of a hardware filter. Assuming that the interrupt request generated passes through the filter routine called, in the manner indicated by the oval 108, the period of the interrupt request is stored and a counter is incremented to indicate the number of periods stored in the manner indicated by the rectangle 110. It should be apparent that the period of the interrupt request, which is stored in the manner indicated by the rectangle 110, is available from the period timer which is incremented every sixty-four microseconds, in the manner indicated by the the rectangle 90.

Thereafter, as indicated by the diamond 112, the state of the count of stored periods is tested to ascertain whether or not sixteen valid periods have been received and stored. If sixteen valid periods have not been stored, in the manner indicated by the arrow 113 annotated NO, the timing loop is returned to at the location indicated by the circular flag A whereupon the period timer is cleared, in the manner indicated by the rectangle 88, and timing for the next interrupt request to be received and stored, in the manner indicated by the rectangle 110, is again initiated. This will continue until sixteen periods, which the filter routine allows the interrupt request count routine to look at, are stored and counted.

When sixteen interrupt requests have been analyzed by the interrupt request count routine and their periods are stored and counted by the program step associated with the rectangle 110, the tests associated with diamond 112 will be affirmative. The program then looks, in the manner indicated by the rectangle 114, at the last twelve periods stored and ascertains which period is the most common period. More particularly, the period of interrupt requests which are stored, in the manner indicated by the rectangle 110, are stored in register locations as numbers between ten and one hundred and twenty-seven, representing frequencies of one hundred and fifty hertz to fifteen hundred hertz, respectively. While the first few periods stored may be somewhat erratic, the remaining periods generally are closely packed and hence a simple comparison may be run on the last twelve periods stored to ascertain which period occurs most frequently and, for this purpose, a value of plus or minus one regarding the numbers stored is employed for the series of comparisons utilized to ascertain the most commonly occurring period.

It should also be noted that, due to the time required for storing and counting sixteen periods as well as for finding the most common period in the manner indicated by the rectangles 110 and 114 as well as diamond 112, the frequency find sub-routine takes approximately twice as long as the frequency test sub-routine.

Once the most common period of the last twelve is ascertained by the series of comparison operations conducted in association with the step indicated by rectangle 114, this value is stored, in the manner indicated by rectangle 116, for use in the interrupt compare routine indicated by block 104. It should be noted that the value stored in association with the step indicated by the rectangle 116 is the value which is assumed as the periodic frequency on the line for both the purposes of setting ringing i.e. did this frequency occur four times, associated with the main routine and also the periodic signal which the interrupt request compare routine employs as the periodic signal against which all other information which it looks at is compared. Once the most common period is stored as a value in the manner indicated by the rectangle 116, the frequency find routine associated with the interrupt request count routine goes to the frequency test sub-routine as indicated by the rectangle 118 so that further interrupt requests will be run through the comparison sub-routine.

When the interrupt request count routine associated with block 84 exits to the frequency test sub-routine associated with block 100, the interrupt handler is set to compare in the manner indicated by the rectangle 102 and the timing loop is again re-entered at the location indicated by the circular flag A so that the program again begins counting the period for the next interrupt which may occur. However, when this interrupt occurs, it is processed in the manner indicated by the interrupt request compare routine associated with the block 104. When this interrupt request now occurs, the interrupt request compare routine associated with block 104 first calls the filter routine in the manner indicated by the oval 120 so that it may be determined whether the frequency of the incoming interrupt request is within the metes and bounds of frequencies for useful information, in the manner mentioned above in association with oval flag 108 and discussed below in detail in association with FIG. 4. Assuming that the period of the interrupt is within the passband of the filter routine, the program then looks to the period timer employed to time the interrupt, in the manner described in association with rectangle 90, to ascertain whether the period thereof is within one hundred and twenty-eight microseconds of the value stored by the interrupt request count routine, in the manner described in association with rectangle 116. This test is indicated by the diamond 122, it being appreciated by those of ordinary skill in the art that the value of one hundred and twenty-eight microseconds is empirically selected to accommodate normal detection tolerances within the circuits employed to time incoming interrupt requests. However, as shall now be apparent, the test associated with the diamond 122, in essence, acts to compare the value stored in association with the rectangle 116 with incoming information and incoming information, which favorably compares, is assumed to be a continuation of the periodic information whose frequency was previously determined while information, which does not compare, is assumed to be non-periodic information.

When a favorable comparison results, as a function of the test indicated by diamond 122, a first counter referred to as the good counter is incremented, in the manner indicated by the arrow 123, and the rectangle 124. Conversely, should the comparison associated with diamond 122 result in a negative determination, a second counter known as the bad counter or non-comparison counter is incremented, in the manner indicated by the arrow 125, and the rectangle 126. Thus, it will be appreciated by those of ordinary skill in the art that the good counter is incremented, in the manner indicated by the rectangle 124, to keep track of the number of interrupt requests received whose frequency corresponds to the frequency stored as value, in the manner associated with rectangle 116, while the bad counter is incremented, in the manner indicated by the rectangle 126, so that a count corresponding to the number of interrupt requests of a frequency other than that established for value is maintained.

Each time the good or bad counters are incremented, in the manner indicated by the rectangles 124 and 126, the state of the count therein is tested, in the manner indicated by the diamond 128 and 130. The state of the count of the good counter is tested, in the manner indicated by the diamond 128, to ascertain whether or not the count is equal to eleven. If a negative result is obtained, in the manner indicated by the arrow 129, location A within the timing loop of this routine is returned to so that the period for the next interrupt request is again accumulated. However, if the test of the state of the good counter, as indicated by the diamond 128, is affirmative, the frequency detection counter is incremented, in the manner indicated by the rectangle 132. The frequency detection counter, it will be recalled, is the counter employed in the main routine illustrated in FIG. 2 for a determination of whether or not a busy signal is present. This counter, it will be recalled, is incremented in the manner just described in association with FIG. 3 each time that the frequency established for value, as set in association with rectangles 52 and 116, is received a sufficient number of times to cause the state of the good counter to assume an eleven count. It will also be recalled that this is the counter which is cleared each time an interval of silence is detected which, in effect, occurs only for legitimate ringing signals and not for busy signals and hence the state of the frequency detect counter is relied upon to determine whether or not a busy signal is being detected. Upon an incrementing of the frequency detecting counter, the interrupt request compare routine returns to the calling routine in the manner indicated by the arrows 133 and the circular return flag 99.

Conversely, the state of the bad counter is tested, in the manner indicated by the diamond 132, to ascertain whether or not the state of the count therein corresponds to 22. If the count does not correspond to 22, a return to the timing loop, in the manner indicated by the arrow 131 annotated NO, occurs, in the manner indicated by the circular flag A. However, if the state of the bad counter equals 22, the speech detecting counter is incremented, in the manner indicated by the rectangle 134. The speech detection counter is employed in conjunction with the frequency detection counter in determining whether or not an answer is present so that the system may go to an announce routine, as aforesaid. It should also be recalled, from the description associated with FIG. 2, that this is also the counter which is not cleared, if no answer condition is detected but ringing has not been set since the phone may have been answered before ringing was detected by a simple "hello". Under these conditions, the system would, in effect, await a second "hello" so that the state of the count in the speech counter could trigger an answer condition as soon as such a subsequent "hello" is received. Conversely, when ringing has been set and no answer condition has been obtained, this counter is cleared.

Upon an incrementing of the speech detection counter, a return to the calling routine occurs, in the manner indicated by the arrows 135 and 133, as well as the circular flag 99. Accordingly, it will be appreciated that the frequency find and frequency test routines illustrated, in FIG. 3, act to quickly ascertain the presence of a periodic signal on the line and to provide information to the main routine so that this signal can be evaluated and, in addition thereto, these routines act to detect changes in information on the line from the periodic value determined so that the presence of speech and an interval of silence may also be evaluated.

The filter routine employed for the purposes of the interrupt request count and interrupt request compare routines illustrated in FIG. 3 is set forth in connection with FIG. 4. More particularly, FIG. 4 is a functional flow diagram illustrating an exemplary digital filter sub-routine employed for purposes of examining input signals to be further treated under program control. The filter routine illustrated in FIG. 4, as indicated by the block 140, is called each time an interrupt request count or compare sub-routine is initiated, in the manner indicated by the ovals 108 and 120. This routine is effectively a software analog to a hardware bandpass filter which acts to limit information which may be examined by the sub-routines to those having frequencies in the range of frequencies on the line which contain useful information.

Thus, as illustrated in FIG. 4, the filter sub-routine, when called, first acts to increment an interrupt counter, in the manner indicated by the rectangle 142. Thus, the filter routine counts each interrupt as the same is received. Thereafter, as indicated by the diamond 144, the state of the interrupt counter is tested to ascertain whether the count therein is equal to two hundred and fifty-six. If an affirmative result obtains, as indicated by the arrow annotated YES, the sub-routine returns to the calling routine at location B, as indicated in FIG. 3 by the circular flag B and the return flag 99. This occurs as the software assumes that, if no decision has been made in two hundred and fifty-six interrupt requests, the interrupt requests are being generated as a function of noise on the line and hence no further review of such interrupt requests should occur under program control. Under these circumstances, as will be appreciated by those of ordinary skill in the art, the thirty-two second timer will eventually time out initiating a hang up sequence. If the state of the interrupt counter is less than two hundred and fifty-six, as indicated by the arrow annotated NO, the program next tests, in the manner indicated by the diamond 146, to ascertain whether or not the state of the period counter is less than 640 microseconds or the count therein is less than ten. Since the period counter is incremented every 64 microseconds, it will be appreciated that, when the state of this counter is less than ten or is indicative of a period smaller than 640 microseconds, the interrupts being generated have a frequency greater than 1.7 kilohertz and, for this reason, are excluded as no useful information of the type which the program seeks to evaluate can be indicated thereby. Accordingly, if the results of the tests associated with the diamond 146 are negative, a return to the timing loop at location A, as indicated by the circular flag A, occurs as the last interrupt received has much too high a frequency to be evaluated.

However, if the result of the tests associated with the diamond 146 is negative, it is indicative that the period of the interrupt request received is above the lower limit established by the filter and hence the filter routine next tests, in the manner indicated by the diamond 148, to ascertain whether the frequency of the interrupt received is above a predetermined limit. This is done by testing to ascertain whether or not the state of the period counter is less than one hundred and twenty-eight which corresponds to a period of approximately 8.2 milliseconds. Should the period counter exhibit a count which is greater than one hundred and twenty-eight, the frequency of the incoming interrupt request is much too low to be examined i.e. below one hundred and sixty hertz and hence has no useful information for the purposes of the frequency find or frequency test sub-routines. Accordingly, under these conditions, as indicated by the arrow annotated YES, a return to the timing loop illustrated in FIG. 3 occurs at location A wherein the period timer is cleared and a new period for the next succeeding interrupt request is timed. However, if the condition of the period timer indicates a period greater than 8.2 milliseconds, the interrupt may be processed and, accordingly, the calling routine is returned to, in the manner indicated by the oval flag 150 annotated RETURN. This will result in a return to either the next step of the calling interrupt request count or interrupt request compare routines illustrated in FIG. 3. Thus, it will be seen that the filter routine illustrated in FIG. 4 ignores all frequencies less than one hundred and sixty hertz and more than 1.7 kilohertz and also considers any two hundred and fifty-six interrupts not resulting in a decision as noise.

Thus, it will be appreciated by those of ordinary skill in the art that the techniques for detecting a condition of response on a telephone line disclosed herein results in a prompt and rapid evaluation of the information to ascertain whether or not a periodic signal is present and, if such a periodic signal is present, its frequency is determined. Thereafter, conditions on the line are evaluated in terms of the periodic signal detected. Non-periodic signals are also determined as a function of the periodic signal detected as well as intervals of silence and, in this manner, actual conditions on the line may be rapidly evaluated. If ringing is detected, the system awaits receipt of an indication of an answer followed by a period of silence for a predetermined interval which is assigned to each calling sequence. However, if a busy signal is present on the line, the system immediately hangs up so that a new calling sequence may be initiated.

Although the present invention has been disclosed in conjunction with a rather specific exemplary embodiment thereof, it will be appreciated by those of ordinary skill in the art that various alternatives and modifications to the specific structure set forth herein may be employed. Thus, a different microprocessor than that described may be utilized and any microprocessor relied upon may be provided with additional RAM should additional functions be desired. Additional modifications in the specific embodiment described may also be accomplished through variation in the techniques through which signals are generated, timed or interpreted and, of course, major variations in the specific programing employed will readily occur to those of ordinary skill in the art. For instance, once sufficient familiarity with an area is acquired, it may become apparent that ring signals, in fact, have a period which is fixed. Under these conditions, a value may simply be inserted into the value register for further use in succeeding portions of the program. In addition, while the instant microprocessor is utilized for purposes principally directed to detecting conditions on the line, it will be appreciated that additional functions such as implementing an automatic dialing sequence from a program list or stack of phone numbers may also be implemented thereby.

While the invention has been described in connection with a preferred exemplary embodiment thereof, it will be understood that many modifications will be readily apparent to those of ordinary skill in the art; and that this application is intended to cover any adaptations or variations thereof. Therefore, it is manifestly intended that this invention be only limited by the claims and the equivalents thereof.

What is claimed is:

1. Apparatus for detecting a condition on a telephone line comprising:
   means for monitoring a telephone line and ascertaining the presence of signals thereon;
   means for determining a value representative of the period of each signal ascertained;
   means for storing an indicia of each value determined for a group of signals whose presence was ascertained in a sequence; and
   means for detecting the most common indicia of value stored for said group of signals whose presence was ascertained in said sequence.

2. The apparatus according to claim 1 wherein said means for monitoring a telephone line and ascertaining the presence of signals thereon includes means for generating interrupt request signals in response to predetermined zero crossings of input signals on said telephone line and said means for determining a value includes period counter means and means for incrementing said period counter means for intervals between occurrences of said interrupt request signals.

3. The apparatus according to claim 1 additionally comprising:
   means for comparing values representative of the period of each signal ascertained subsequent to a detection of said most common indicia of value with said most common indicia of value and providing an output signal representative of the result of such comparison;
   first and second counter means;
   means for incrementing said first counter means each time an output signal representing a successful comparison is obtained; and
   means for incrementing said second counter means each time an unsuccessful comparison is obtained.

4. The apparatus according to claim 3 additionally comprising means responsive to a count in said second counter means for indicating a condition of speech on said telephone line.

5. The apparatus according to claim 4 additionally comprising means responsive to said indication of speech for sampling the state of said count in said second counter means and indicating the presence of a recorded message on said telephone line whenever said count in said second counter means exceeds a predetermined level.

6. The apparatus according to claim 3 additionally comprising:
   means for ascertaining if a plurality of signals have been consecutively ascertained having periods corresponding to said most common indicia of value and providing an output when this condition obtains; and
   means for setting a ring condition indication in response to said output from said means for ascertaining.

7. The apparatus according to claim 6 wherein said means for monitoring a telephone line and ascertaining the presence of signals thereon includes means for generating interrupt request signals in response to predetermined zero crossings of input signals on said telephone line and said means for determining a value includes period counter means and means for incrementing said period counter means for intervals between occurrences of said interrupt request signals.

8. The apparatus according to claim 7 additionally comprising means for selectively clearing said first counter means whenever said period counter means reaches a predetermined state indicative of an interval of silence on said telephone line.

9. The apparatus according to claim 8 additionally comprising means responsive to said setting of said ring indication and a predetermined count in said first counter means for indicating a "busy" signal on said telephone line.

10. The apparatus according to claim 9 additionally comprising means responsive to a count in said second counter means for indicating a condition of speech on said telephone line.

11. The apparatus according to claim 10 additionally comprising means responsive to said indication of speech for sampling the state of said count in said second counter means and indicating the presence of a recorded message on said telephone line whenever said count in said second counter means exceeds a predetermined level.

12. The apparatus according to claim 11 wherein said predetermined level comprises a first value if said ring indication is set and a second, lower value if said ring indication has not been set by means for setting.

13. The apparatus according to claim 7 additionally comprising:
   means responsive to said period counter means reaching a predetermined state indicative of an interval of silence, for indicating a condition of silence is present on said telephone line; and
   means responsive to said indication of said condition of silence on said telephone line for testing the state of the count in said first and second counter means to ascertain if an answer condition is present.

14. The apparatus according to claim 13 wherein said means for testing said state of the count in said first and second counter means to ascertain if an answer condition is present comprises:
   means for testing whether a ring condition has been set;
   means for saving indications of the results of a sequence of preceding comparisons made by said means for comparing; and
   means responsive to a ring condition being set for indicating an answer condition is present if one of the following conditions is present:
   (a) a majority of saved indications correspond to unsuccessful comparisons,
   (b) the state of the count of said second counter means exceeds a predetermined value and is greater than the state of the count in the first counter means.

15. The apparatus according to claim 14 wherein said means for indicating an answer condition is present acts in the absence of said ring condition being set to indicate the presence of an answer condition only if the state of the count in said first counter means is less than a predetermined multiple of the count in said second counter means minus a predetermined constant.

16. The apparatus according to claim 13 additionally comprising means for responding to an absence of said answer condition being present for determining if a ring condition has been set, said last named means acting to clear said first and second counter means only if said ring condition is set.

17. Apparatus for detecting a condition on a telephone line comprising:
   means for monitoring a telephone line and receiving input signal information therefrom;

means for generating timed pulses corresponding to predetermined zero crosspoints of input signals exceeding a selected threshold level;

processor means having an interrupt request input, storage means and arithmetic means; and means for applying said timed pulses to said interrupt request input of said processor means, said processor means responsive to said timed pulses to time the time interval therebetween to obtain a period therefor, store each period obtained for a preselected group of timed pulses in sequence and determining the most prevalent period stored.

18. A method for detecting a condition on a telephone line comprising the steps of:

monitoring a telephone line to ascertain the presence of signals thereon;

generating a pulse for each signal ascertained;

timing intervals between generated pulses to obtain values representative of the period of each signal ascertained;

storing indicia of each value obtained for a group of signals ascertained in a sequence; and determining the most common value stored for said group of signals whose presence was ascertained in said sequence.

19. The method according to claim 18 additionally comprising the steps of:

comparing values representative of the period of each signal ascertained subsequent to a determination of said most common value stored with said value determined and providing an output signal representative of the results of each comparison;

providing first and second counter means;

incrementing said first counter means each time an output signal representing a successful comparison is obtained; and incrementing said second counter means each time an unsuccessful comparison is obtained.

20. The method according to claim 19 wherein said step of generating a pulse for each signal ascertained includes the step of producing interrupt request signals in response to predetermined zero crossings of signals on said telephone line and said step of timing intervals between generated pulses includes the steps of providing a period counter means and incrementing said period counter means at a predetermined rate during intervals between the occurrences of said interrupt request signals.

21. The method according to claim 20 additionally comprising the steps of:

detecting if a plurality of signals having periods corresponding to said most common value have been consecutively ascertained and providing an output when this condition obtains; and setting a ring condition indication in response to said output from said means for ascertaining.

22. The method according to claim 21 additionally comprising the step of selectively clearing said first counter means whenever said period counter means reaches a predetermined state indicative of an interval of silence on said telephone line.

23. The method according to claim 22 additionally comprising the steps of:

testing to ascertain the state of the count in said first counter means; and determining that a "busy" signal is on said telephone line if said ring condition has been set and said state of said count in said first counter means has reached a preselected value.

24. The method according to claim 23 additionally comprising the steps of:

testing to ascertain the state of the count in said second counter means; and indicating speech signals are present on said telephone line whenever said state of said count in said second counter means exceeds a predetermined level.

25. The method according to claim 24 additionally comprising the steps of:

sampling the state of said second counter means in response to an indication of speech; and indicating the presence of a recorded message on said telephone line whenever said count in said second counter means exceeds a selected level.

26. The method according to claim 25 wherein said selected level of count in said second counter means is a first value if said ringing indication is set and a second, lower value if said ringing indication has not been set.

27. The method according to claim 21 additionally comprising the steps of:

indicating an interval of silence is present on said telephone line whenever said period counter means reaches a predetermined state; and testing the state of the count in said first and second counter means to ascertain if an answer condition is present in response to an indication of silence.

28. The method according to claim 27 wherein said step of testing the state of the count in said first and second counter means to ascertain if an answer condition is present is accomplished by the steps of:

testing whether a ring condition has been set;

saving indications of the results of a sequence of preceding comparisons of periods of signals ascertained subsequent to a determination of said most common value stored; and indicating an answer condition is present if said ring condition has been set and a majority of saved indications correspond to unsuccessful comparisons or said ring condition has been set and the state of the count of said second counter means exceeds a predetermined value and is greater than the state of the count in said first counter means.

29. The method according to claim 28 wherein said step of testing the state of the count in said first and second counter means additionally includes the step of indicating an answer condition is present if said ring condition has not been set only if the state of the count in said first counter means is less than a predetermined multiple of the count in said second counter means less a constant.

30. Apparatus for detecting a condition on a telephone line comprising:

means for monitoring a telephone line and determining the presence of condition indicating events thereon;

means for determining a value representative of the interval between each succeeding event;

means for storing a selected interval value; and means for comparing each value determined as an interval between succeeding events with said selected interval value and providing an output signal representative of the result of such comparison.

31. The apparatus according to claim 30 wherein said means for monitoring a telephone line and ascertaining the presence of condition indicating events thereon includes means for generating interrupt request signals in response to predetermined zero crossings of each event on said telephone line and said means for determining a value includes period counter means and means for incrementing said period counter means for intervals between occurrences of said interrupt request signals.

32. The apparatus according to claim 30 additionally comprising:
first and second counter means;
means for incrementing said first counter means each time an output signal representing a successful comparison is obtained; and
means for incrementing said second counter means each time an unsuccessful comparison is obtained.

33. The apparatus according to claim 32 additionally comprising means responsive to a count in said second counter means for indicating a condition of speech on said telephone line.

34. The apparatus according to claim 33 additionally comprising means responsive to said indication of speech for sampling the state of said count in said second counter means and indicating the presence of a recorded message on said telephone line whenever said count in said second counter means exceeds a predetermined level.

35. The apparatus according to claim 34 wherein said predetermined level comprises a first value if said ring indication is set and a second, lower value if said ring indication has not been set by means for setting.

36. The apparatus according to claim 32 additionally comprising:
means for ascertaining if a plurality of condition indicating events have been consecutively ascertained having intervals therebetween corresponding to said selected interval value and providing an output when this condition obtains; and
means for setting a ring condition indication in response to said output from said means for ascertaining.

37. The apparatus according to claim 36 wherein said means for monitoring a telephone line and ascertaining the presence of condition indicating events thereon includes means for generating interrupt request signals in response to predetermined zero crossings of each event on said telephone line and said means for determining a value includes period counter means and means for incrementing said period counter means for intervals between occurrences of said interrupt request signals.

38. The apparatus according to claim 37 additionally comprising means for selectively clearing said first counter means whenever said period counter means reaches a predetermined state indicative of an interval of silence on said telephone line.

39. The apparatus according to claim 38 additionally comprising means responsive to said setting of said ring indication and a predetermined count in said first counter means for indicating a "busy" signal on said telephone line.

40. The apparatus according to claim 37 additionally comprising:
means responsive to said period counter means reaching a predetermined state indicative of an interval of silence, for indicating a condition of silence is present on said telephone line; and
means responsive to said indication of said condition of silence on said telephone line for testing the state of the count in said first and second counter means to ascertain if an answer condition is present.

41. The apparatus according to claim 40 wherein said means for testing said state of the count in said first and second counter means to ascertain if an answer condition is present comprises:
means for testing whether a ring condition has been set;
means for saving indications of the results of a sequence of preceding comparisons made by said means for comparing; and
means responsive to a ring condition being set for indicating an answer condition is present if one of the following conditions is present:
(a) a majority of saved indications correspond to unsuccessful comparisons,
(b) the state of the count of said second counter means exceeds a predetermined value and is greater than the state of the count in the first counter means.

42. The apparatus according to claim 41 wherein said means for indicating an answer condition is present acts in the absence of said ring condition being set to indicate the presence of an answer condition only if the state of the count in said first counter means is less than a predetermined multiple of the count in said second counter means minus a predetermined constant.

* * * * *